United States Patent
Yu et al.

(10) Patent No.: US 11,395,264 B2
(45) Date of Patent: Jul. 19, 2022

(54) METHOD AND APPARATUS FOR DATA TRANSMISSION IN MULTIPLE CARRIERS

(71) Applicant: HUAWEI TECHNOLOGIES CO., LTD., Shenzhen (CN)

(72) Inventors: Feng Yu, Beijing (CN); Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 16/847,905

(22) Filed: Apr. 14, 2020

(65) Prior Publication Data
US 2020/0245294 A1   Jul. 30, 2020

Related U.S. Application Data

(63) Continuation of application No. PCT/CN2018/109767, filed on Oct. 11, 2018.

(30) Foreign Application Priority Data

Oct. 16, 2017 (CN) .......................... 201710960133.7

(51) Int. Cl.
   *H04W 72/04* (2009.01)
   *H04W 48/20* (2009.01)
   *H04W 72/02* (2009.01)

(52) U.S. Cl.
   CPC ......... *H04W 72/02* (2013.01); *H04W 72/042* (2013.01); *H04W 72/0453* (2013.01); *H04W 72/0493* (2013.01)

(58) Field of Classification Search
   None
   See application file for complete search history.

(56) References Cited

U.S. PATENT DOCUMENTS

2004/0157561 A1* 8/2004 Akerberg ............... H04J 11/005
                                                         455/67.11
2007/0087757 A1* 4/2007 Core ..................... H04W 48/18
                                                          455/453

(Continued)

FOREIGN PATENT DOCUMENTS

CN         1808951 A       7/2006
CN       101534235 A       9/2009

(Continued)

OTHER PUBLICATIONS

ZTE: "Remaining issues on multi-carrier PRACH in NB-IoT", R2-167682, XP051177504, Nov. 13, 2016, total 6 pages.

*Primary Examiner* — Sai Aung
(74) *Attorney, Agent, or Firm* — Rimon PC (57) ABSTRACT

Embodiments of this application relate to the communications field, and provide a method and an apparatus for data transmission in multiple carriers. Uplink access carriers may be dynamically adjusted when the uplink load is heavy. The method includes receiving, by a terminal device, at least one piece of indication information from an access network device, where the at least one piece of indication information indicates at least one access control parameter. The method further includes selecting, by the terminal device, an access carrier from at least two candidate carriers based on the at least one access control parameter, where the at least two candidate carriers are in different frequency bands.

15 Claims, 3 Drawing Sheets

(56) References Cited

U.S. PATENT DOCUMENTS

| | | | |
|---|---|---|---|
| 2007/0218913 A1 | 9/2007 | Chen | |
| 2010/0316146 A1* | 12/2010 | McBeath | H04L 5/0091 |
| | | | 375/260 |
| 2012/0076042 A1 | 3/2012 | Chun et al. | |
| 2016/0044539 A1* | 2/2016 | Yiu | H04W 88/02 |
| | | | 370/235 |
| 2017/0222746 A1* | 8/2017 | Kang | H04W 72/0453 |
| 2018/0270687 A1* | 9/2018 | Dalsgaard | H04W 24/10 |

FOREIGN PATENT DOCUMENTS

| | | |
|---|---|---|
| CN | 105634699 A | 6/2016 |
| CN | 106686727 A | 5/2017 |

* cited by examiner

METHOD AND APPARATUS FOR DATA TRANSMISSION IN MULTIPLE CARRIERS

CROSS-REFERENCE TO RELATED DISCLOSURES

This disclosure is a continuation of International Application No. PCT/CN2018/109767, filed on Oct. 11, 2018, which claims priority to Chinese Patent Application No. 201710960133.7, filed on Oct. 16, 2017. The disclosures of the aforementioned applications are hereby incorporated by reference in their entireties.

TECHNICAL FIELD

This application relates to the communications field, and in particular, to a method and an apparatus for data transmission in multiple carriers.

BACKGROUND

The narrow band internet of things (NB-IoT) is a feature in long term evolution (LTE) release-13. For random access, the concept of coverage level is introduced in the NB-IoT. In an idle state, when a terminal device needs to access the network, downlink reference signal received power (RSRP) measurement may be performed, and measurement results of the RSRP correspond to different coverage levels. A system message configured by an access network device broadcasts an uplink physical random access channel (PRACH) resource corresponding to each coverage level and the quantity of times of preamble repetitions on each carrier. The terminal device selects, based on the coverage level of the terminal device in the system message, a corresponding PRACH resource to perform access.

However, in the prior art random access method, the terminal device only determines, based on a downlink measurement result, the coverage level to adjust a PRACH resource of an uplink access carrier without considering the load problem between a plurality of uplink access carriers. When the uplink load is relatively heavy, the load among the uplink access carriers cannot be dynamically adjusted.

SUMMARY

Embodiments of this application provide a method and an apparatus for data transmission in multiple carriers, so that carrier selection and random access can be performed in uplink access carriers of different frequency bands based on an access control parameter, thereby implementing load control among a plurality of uplink access carriers.

According to a first aspect, an embodiment of this application provides a method for data transmission in multiple carriers, including:

receiving, by a terminal device, at least one piece of indication information from an access network device, where the at least one piece of indication information is used to indicate at least one access control parameter; and selecting, by the terminal device, an access carrier from the at least two candidate carriers based on the at least one access control parameter, where the at least two candidate carriers are located in different frequency bands. The method according to this embodiment of this application may enable carriers to set different access parameters based on loading situations and a quantity of available carrier resources. Carrier resources can be used to the greatest extent, to balance network load and improve system capacity, so that a terminal device can access a network more rapidly and reduce access delay.

In a possible implementation, the at least two candidate carriers include a first candidate carrier and a second candidate carrier, the at least one access control parameter includes a first threshold of downlink signal strength; and the selecting, by the terminal device, an access carrier from the at least two candidate carriers based on the at least one access control parameter includes: selecting, by the terminal device, the first candidate carrier as the access carrier when a downlink signal strength value of the first candidate carrier is greater than the first threshold; and selecting, by the terminal device, the second candidate carrier as the access carrier when the downlink signal strength value of the first candidate carrier is less than the first threshold.

In a possible implementation, the at least two candidate carriers include a first candidate carrier and a second candidate carrier, the at least one access control parameter includes a first access control factor; and the selecting, by the terminal device, an access carrier from the at least two candidate carriers based on the at least one access control parameter includes: selecting, by the terminal device, the first candidate carrier as the access carrier when a random number generated by the terminal device is greater than the first access control factor; and selecting, by the terminal device, the second candidate carrier as the access carrier when the random number generated by the terminal device is less than the first access control factor; or selecting, by the terminal device, the first candidate carrier as the access carrier when a random number generated by the terminal device is less than the first access control factor; and selecting, by the terminal device, the second candidate carrier as the access carrier when the random number generated by the terminal device is greater than the first access control factor.

In a possible implementation, the at least two candidate carriers are N candidate carriers, N≥2, the at least one access control parameter includes N non-overlapping value ranges, and the N value ranges correspond to the N candidate carriers; and the selecting, by the terminal device, an access carrier from the at least two candidate carriers based on the at least one access control parameter includes: selecting, by the terminal device, a candidate carrier corresponding to a first value range as the access carrier when a random number generated by the terminal device is located in the first value range of the N value ranges.

In a possible implementation, the at least two candidate carriers include at least one first candidate carrier and at least one second candidate carrier; the at least one access control parameter includes at least one first threshold of downlink signal strength, and the at least one first threshold corresponds to the at least one first candidate carrier; and the selecting, by the terminal device, an access carrier from the at least two candidate carriers based on the at least one access control parameter includes: selecting, by the terminal device, from the at least one first candidate carrier, a candidate carrier in which a downlink signal strength is greater than a corresponding first threshold as the access carrier; and selecting the at least one second candidate carrier as the access carrier when a quantity of candidate carriers selected as the access carrier from the at least one first candidate carrier is less than a target quantity.

In a possible implementation, the at least two candidate carriers are a part or all of a carrier set, the carrier set includes at least two carriers. The at least one access control parameter further includes at least one of a second threshold of a downlink signal strength value corresponding to each carrier in the carrier set, a second value range corresponding to each carrier, and an admission indication corresponding to each carrier. The method further includes: determining, by the terminal device, a carrier that satisfies a first condition and that is in the at least two carriers as the candidate carrier, where the first condition includes at least one of the following: a downlink signal strength of a carrier is greater than the second threshold of the downlink signal strength value corresponding to the carrier; a random number generated for a carrier is in the second value range corresponding to the carrier, and the admission indication corresponding to a carrier indicates permission to access the carrier.

According to a second aspect, an embodiment of this application provides a method for data transmission in multiple carriers, including: generating, by an access network device, at least one piece of indication information, where the at least one piece of indication information is used to indicate at least one access control parameter, the at least one access control parameter is used to select an access carrier from at least two candidate carriers, and the at least two candidate carriers are located in different frequency bands; and sending, by the access network device, the indication information to the terminal device.

In a possible implementation, the at least two candidate carriers include a first candidate carrier and a second candidate carrier. The at least one access control parameter includes a first threshold of downlink signal strength. The first threshold is used to instruct the terminal device to select the first candidate carrier as the access carrier when a downlink signal strength value of the first candidate carrier is greater than the first threshold, and select the second candidate carrier as the access carrier when the downlink signal strength value of the first candidate carrier is less than the first threshold.

In a possible implementation, the at least two candidate carriers include a first candidate carrier and a second candidate carrier. The at least one access control parameter includes a first access control factor. The first access control factor is used to indicate that the first candidate carrier is selected as the access carrier when a random number generated by the terminal device is greater than the first access control factor, and the second candidate carrier is selected as the access carrier when the random number generated by the terminal device is less than the first access control factor.

In a possible implementation, the at least two candidate carriers are N candidate carriers, N≥2, the at least one access control parameter includes N non-overlapping value ranges, and the N value ranges correspond to the N candidate carriers. The N value ranges are used to indicate that a candidate carrier corresponding to a first value range is selected as the access carrier when a random number generated by the terminal device is located in the first value range of the N value ranges.

In a possible implementation, the at least two candidate carriers include at least one first candidate carrier and at least one second candidate carrier. The at least one access control parameter includes at least one first threshold of downlink signal strength, and the at least one first threshold corresponds to the at least one first candidate carrier. The first threshold instructs the terminal device to select, from the at least one first candidate carrier, a candidate carrier in which a downlink signal strength is greater than a corresponding first threshold as the access carrier, and select the at least one second candidate carrier as the access carrier when a quantity of candidate carriers selected from the at least one first candidate carrier as the access carrier is fewer than a target quantity.

In a possible implementation, the at least two candidate carriers are a part or all of a carrier set, and the carrier set includes at least two carriers. The at least one access control parameter further includes at least one of a second threshold of a downlink signal strength value corresponding to each carrier in the carrier set, a second value range corresponding to each carrier, and an admission indication corresponding to each carrier. The candidate carrier is a carrier that satisfies a first condition and that is in the at least two carriers, where the first condition includes at least one of the following: a downlink signal strength value of a carrier is greater than the second threshold of the downlink signal strength value corresponding to the carrier, a random number generated for a carrier is in the second value range corresponding to the carrier, and the admission indication corresponding to a carrier indicates permission to access the carrier.

According to a third aspect, an embodiment of this application provides a terminal device, configured to perform the method according to the first aspect. Specifically, the terminal device includes units configured to perform the method according to the first aspect or any one of the implementations of the first aspect.

According to a fourth aspect, an embodiment of this application provides an access network device, configured to perform the method according to the second aspect. Specifically, the access network device includes units or circuits configured to perform the method according to the second aspect or any one of the implementations of the second aspect.

According to a fifth aspect, a computer-readable storage medium is provided, where the computer-readable storage medium stores a computer program (instruction), and when running on a computer, the program (instruction) enables the computer to perform the method according to any one of the foregoing aspects.

According to a sixth aspect, this application provides a chip system. The chip system includes a processor, configured to support a terminal device and an access network device in implementing a related function according to the foregoing aspects, for example, generating or processing related data and/or information in the foregoing method. In a possible design, the chip system further includes a memory. The memory is configured to store a program instruction and data. The chip system may include a chip, or may include a chip and another discrete device.

DESCRIPTION OF EMBODIMENTS

The following describes the technical solutions in the embodiments of the present invention with reference to the accompanying drawings in the embodiments of the present invention. It should be noted that the technical solutions or features in the embodiments of the present invention may be mutually combined in the case of no conflict.

The "one" in the embodiments of the present invention indicates a single individual, does not indicate that there can only be one individual, and cannot be applied to other individuals. For example, "a terminal device" in the embodiments of the present invention refers to a terminal device, and does not mean that only one specific terminal device can be applied to. The terms "system" and "network" may be used interchangeably in this application.

The reference of "an embodiment" (or "an implementation") or "embodiment" (or "implementation") in this application means that the specific feature, structure, characteristic, and the like described in the embodiments are included in at least one embodiment. Therefore, "in an embodiment" or "in the embodiments" that appears at positions of the specification does not necessarily refer to a same embodiment.

Further, in the embodiments of the present invention, in situations of "A and/or B" and "at least one of A and B", the terms "and/or" and "at least one of" are used, including any one of three solutions, that is, a solution including A, but excluding B, a solution including B, but excluding A, and a solution including both two options A and B. In another example, in situations of "A, B, and/or C" and "at least one of A, B, and/or C", such phrases include any one of six solutions, that is, a solution including A, but excluding B and C, a solution including B, but excluding A and C, a solution including C, but excluding A and B, a solution including A and B, but excluding C, a solution including B and C, but excluding A, a solution including A and C, but excluding B, and a solution including all of the three options A, B, and C. A person of ordinary skill in the art and the related art can easily understand that, for other similar descriptions, the embodiments of the present invention can all be understood in the foregoing manners.

Figure 1:
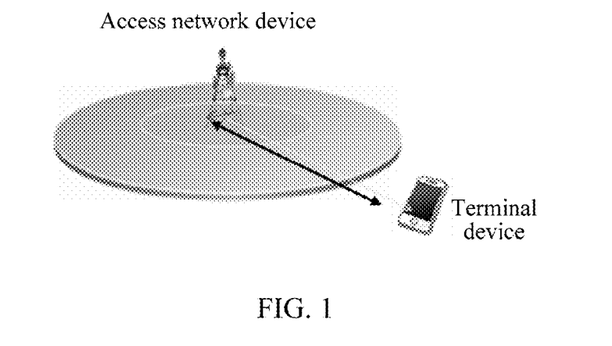
FIG. 1 is a schematic architectural diagram of a wireless communications system according to an embodiment of this application.

An access network device and a terminal device are included in a schematic architectural diagram of a wireless communications system shown in FIG. 1. The access network device in this embodiment of this application refers to a device that is connected to the terminal device and that receives data of the terminal device and sends the data to a core network (CN). The access network device in different systems corresponds to different devices. For example, the access network device may be a base station (BS) and a base station controller (BSC) in a 2G system, or may be a Node B and a radio network controller (RNC) in a 3G system, or may be an evolved Node B (eNB, or e-Node B) in a 4G system, or may also be a corresponding access network device in a 5G system, for example, a gNB (next generation Node B). This is not limited in this application.

The terminal device in this embodiment of this application may be a device that provides a user with voice and/or data connectivity, a handheld device with a radio connection function, or any processing device connected to a radio modem. A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user terminal, a user agent, a terminal device, or user equipment.

In the schematic diagram of FIG. 1, currently, a 5G new radio (NR) may be deployed on a 3.5G frequency band that uses a time division duplex (TDD) mode. Because the high frequency signal attenuation is relatively fast, while the terminal device has relatively small transmit power in a 5G NR uplink, uplink coverage is relatively limited. Because compared with a downlink service, an uplink service of the LTE has relatively light load, the uplink may allocate redundant resources to the NR for use. Therefore, to resolve a problem of limited uplink coverage of the 5G NR, the 3rd generation partnership project (3GPP) standard aims to use an uplink carrier of a frequency band with relatively light LTE uplink service load for uplink transmission of the 5G NR. A communication mechanism based on the architecture needs to be further refined and perfected.

Figure 2:
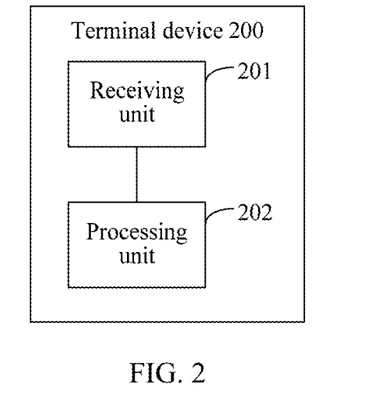
FIG. 2 is a structural diagram of a terminal device according to an embodiment of this application.
Figure 3:
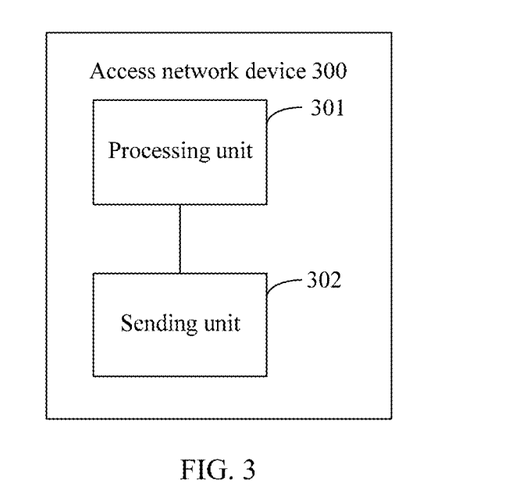
FIG. 3 is a structural diagram of an access network device according to an embodiment of this application.
Figure 4:
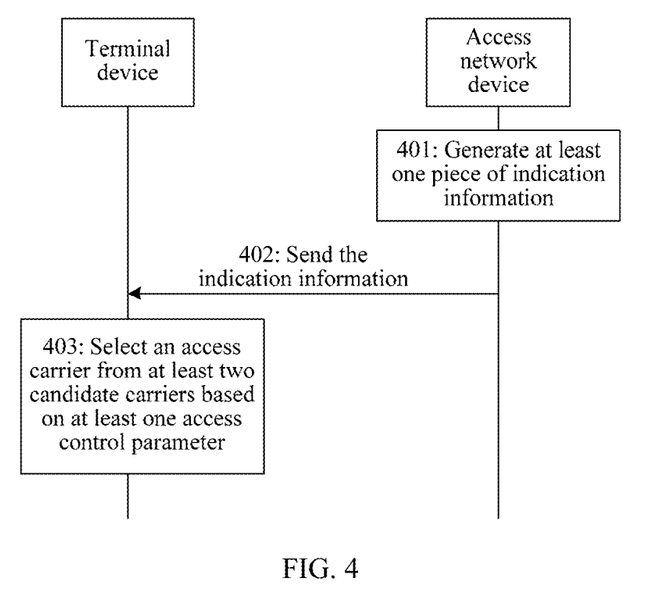
FIG. 4 is a flowchart of a method for data transmission in multiple carriers according to an embodiment of this application.

To resolve the problem of limited uplink coverage in a 5G NR network, embodiments of this application provide a method for data transmission in multiple carriers, and a terminal device and an access network device implementing the method. FIG. 2 is a schematic structural diagram of a terminal device 200 according to an embodiment of this application, and the terminal device 200 includes a receiving unit 201 and a processing unit 202. FIG. 3 is a schematic structural diagram of an access network device 300 according to an embodiment of this application, and the access network device 300 includes a processing unit 301 and a sending unit 302. FIG. 4 is a flowchart of a method for data transmission in multiple carriers according to an embodiment of this application, and the method may be applied to the network architecture shown in FIG. 1, and the terminal device and the access network device that are shown in FIG. 2 and FIG. 3. It is noted that in this present application, the term "unit" may refer to software modules or hardware circuits programmed, via embedded software program or installed software executable, to carry out the corresponding processes and steps disclosed herein.

A 1.8G frequency band using a frequency division duplex (FDD) mode is used for uplink transmission of a 5G NR, and may be applied to a scenario in which the LTE and NR systems coexist, or a scenario in which one cell supports a plurality of uplink carriers. Further, different uplink carriers may employ different radio access technologies (RAT). However, this application is not limited to this scenario. In the scenario to which this embodiment of this application is applied, the access network device uses a 3.5G frequency band to communicate in a downlink carrier, and sends a cell system message and other downlink messages on the 3.5G frequency band; and the terminal device uses the TDD mode on an uplink 3.5G frequency band carrier, and also supports communication of an uplink 1.8G frequency band carrier at the same time. The access network device supports uplink communication on 1.8G and 3.5G frequency bands, and may instruct, based on an uplink measurement result of the terminal device, the terminal device to perform a handover on the uplink carrier.

The following describes the method for data transmission in multiple carriers according to the embodiments of this application in detail with reference to FIG. 2, FIG. 3, and FIG. 4.

Step 401: A processing unit 301 of an access network device 300 generates at least one piece of indication information used to indicate at least one access control parameter.

The at least one access control parameter is used to select an access carrier from at least two candidate carriers, and the at least two candidate carriers are located in different frequency bands. For example, when there are two candidate carriers, one is an uplink carrier of a 1.8G frequency band and the other is an uplink carrier of a 3.5G frequency band, the indication information includes access control parameters of the uplink carrier of the 1.8G frequency band and the uplink carrier of the 3.5G frequency band. Optionally, the access control parameter may include a threshold of downlink signal strength, for example, a threshold T-threshold of the RSRP or reference signal received quality (RSRQ) measurement. Optionally, the access control parameter may include an access control factor. The access control factor is a probability value P, and a value range of the probability value P is [0,1], that is, 0<=P<=1.

Step 402: A sending unit 302 of the access network device 300 sends the indication information to the terminal device.

When the sending unit 302 of the access network device 300 sends at least one piece of indication information to the terminal device 200, the receiving unit 201 of the terminal device 200 receives the at least one piece of indication information. The processing unit of the terminal device 200 selects an uplink access carrier based on at least one access control parameter that is of different frequency band carriers and that is indicated by the at least one piece of indication information received by the receiving unit 201.

The processing unit 202 of the terminal device 200 records information such as frequencies, bandwidths, and the like of candidate carriers in different frequency bands based on the indication information received by the receiving unit 201. For example, if the example of the foregoing two uplink carriers continues to be used, the processing unit 202 may record, based on indication information including access control parameters of the uplink carrier of the 1.8G frequency band and the uplink carrier of the 3.5G frequency band, information such as frequencies, bandwidths, and the like of the uplink carrier of the 1.8G frequency band used in the LTE system and the uplink carrier of the 3.5G frequency band used in the 5G NR system.

Step 403: The processing unit 202 of the terminal device 200 selects the access carrier from at least two candidate carriers based on at least one access control parameter.

A plurality of optional implementations of this embodiment are described in detail below.

Implementation 1

In implementation 1, at least two candidate carriers include a first candidate carrier and a second candidate carrier, and at least one access control parameter includes a first threshold of downlink signal strength. The processing unit 202 of the terminal device 200 selects the first candidate carrier as the access carrier when a downlink signal strength value of the first candidate carrier is greater than the first threshold, and the processing unit 202 of the terminal device 200 selects the second candidate carrier as the access carrier when the downlink signal strength value of the first candidate carrier is less than the first threshold.

For example, the candidate carriers are carriers of two frequency bands: 1.8G and 3.5G frequency bands, and at least one access control parameter includes a threshold of the RSRP or the RSRQ. If a value of the RSRP or the RSRQ measured by the processing unit 202 of the terminal device 200 exceeds the threshold T-threshold, it is determined that the uplink coverage is relatively poor, and the uplink carrier of the 1.8G frequency band is selected for access. If the value of the RSRP or the RSRQ measured by the processing unit 202 is less than the threshold T-threshold, it is determined that the uplink coverage is relatively good, and the uplink carrier of the 3.5G frequency band is selected for access.

Implementation 2

In implementation 2, the candidate carriers are carriers of two frequency bands, and at least one access control parameter includes an access control factor. If a random number generated by the processing unit 202 of the terminal device 200 is greater than the access control factor, a first frequency band carrier is selected for access. If the random number generated by the processing unit 202 is less than the access control factor, a second frequency band carrier is selected for access. Alternatively, if a random number generated by the processing unit 202 of the terminal device 200 is less than the access control factor, a first frequency band carrier is selected for access, and if the random number generated by the processing unit 202 is greater than the access control factor, a second frequency band carrier is selected for access.

Implementation 3

In implementation 3, the candidate carriers are carriers of a plurality of frequency bands, for example, a quantity of the candidate carriers is N, N is a positive integer greater than and equal to two. At least one access control parameter includes N non-overlapping value ranges, where the N value ranges correspond to N candidate carriers. When the downlink signal strength value measured by or the random number generated by the processing unit 202 of the terminal device 200 is located in a first value range of the N value ranges, the processing unit 202 selects a candidate carrier corresponding to the value range as the access carrier.

Implementation 4

In implementation 4, at least two candidate carriers are a part or all of a carrier set, and the carrier set includes at least two carriers. At least one access control parameter includes at least one of a second threshold of the downlink signal strength value corresponding to each carrier in the carrier set, a second value range corresponding to each carrier, and an admission indication corresponding to each carrier. The second threshold of the downlink signal strength value, the second value range corresponding to each carrier, and the admission indication corresponding to each carrier are used to determine a candidate carrier from the carrier set.

Specifically, the processing unit 202 of the terminal device 200 determines a carrier that satisfies at least one of the following conditions and that is in at least two carriers as the candidate carrier:

a downlink signal strength value of a carrier is greater than the second threshold of the downlink signal strength value corresponding to the carrier;

a random number generated for a carrier is in the second value range corresponding to the carrier; and the admission indication corresponding to a carrier indicates permission to access the carrier.

Optionally, at least one access control parameter includes the admission indication corresponding to each carrier, and the processing unit 202 of the terminal device 200 selects the candidate carrier based on carriers to which access is allowed based on the admission indication. If a quantity of the carriers to which access is allowed based on the admission indication is greater than and equal to two (that is, there are at least two candidate carriers), a final access carrier may be continuously selected based on any one or a combination of the foregoing listed implementations.

For example, admission indications included in at least one access control parameter are 0 and 1 that are of a Boolean type. When an admission indication corresponding to a carrier is 0, it indicates permission to access the carrier; and when an admission indication corresponding to a carrier is 1, it indicates that the carrier cannot be accessed (similarly, when an admission indication corresponding to a carrier is 1, it indicates permission to access the carrier, and when an admission indication corresponding to a carrier is 0, it indicates that the carrier cannot be accessed).

If a quantity of candidate carriers in the carrier set of which a corresponding admission indication is 0 (similarly, when the admission indication corresponding to the carrier is 1) is greater than and equal to two, a final access carrier may be continuously selected based on any one or a combination of the foregoing listed implementations.

Implementation 5

In implementation 5, the candidate carriers are carriers of a plurality of frequency bands, for example, a quantity of candidate carriers is Y, Y is a positive integer greater than and equal to two, at least one access control parameter includes M non-overlapping value ranges, M≤Y, and M is a positive integer. When the downlink signal strength value measured by or the random number generated by the processing unit 202 of the terminal device 200 is located in a second value range of the M value ranges, the processing unit 202 selects a candidate carrier corresponding to the value range as the access carrier.

Because Y≤N, when the quantity of candidate carriers corresponding to the selected value range exceeds one, the candidate carrier may continue to be selected based on an implementation similar to the foregoing implementation. For example, the processing unit 202 of the terminal device 200 may select the candidate carrier based on at least one of the following conditions until the quantity of the final candidate carrier is one.

For example, if there are two candidate carriers (for example, a first carrier and a second carrier) corresponding to the value range, the processing unit 202 of the terminal device 200 selects the first carrier as the access carrier if a downlink signal strength value (for example, a measurement value of the RSRP or the RSRQ) of a carrier is greater than a threshold (for example, T1) of the downlink signal strength value corresponding to the carrier, and selects the second carrier as the access carrier if a downlink signal strength value (for example, a measurement value of the RSRP or the RSRQ) of a carrier is less than a threshold (for example, T2) of the downlink signal strength value corresponding to the carrier.

For another example, if there are three candidate carriers corresponding to the value range, at least one access control parameter includes three non-overlapping value ranges, and the downlink signal strength value measured by or the random number generated by the processing unit 202 of the terminal device 200 is located in a value range of the three value ranges, the processing unit 202 selects a candidate carrier corresponding to the value range as the access carrier.

Implementation 6

In implementation 6, at least one access control parameter includes at least one first threshold of the downlink signal strength, and the at least one first threshold corresponds to the at least one first candidate carrier. The processing unit 202 of the terminal device 200 selects, from the at least one first candidate carrier, a candidate carrier of which the downlink signal strength is greater than a corresponding first threshold as the access carrier, and selects at least one second candidate carrier as the access carrier when a quantity of candidate carriers selected as the access carrier from at least one first candidate carrier is less than a target quantity.

For example, the candidate carriers are carriers of three frequency bands: a first frequency band carrier, a second frequency band carrier, and a third frequency band carrier, and the access control parameter includes a threshold T3 of measured downlink signal strength RSRP or RSRQ. If the RSRP or RSRQ value of the first frequency band carrier measured by the processing unit 202 of the terminal device 200 is greater than the threshold T3, the first frequency band carrier is selected as the access carrier. If the RSRP or RSRQ value of the first frequency band carrier measured by the processing unit of the terminal device 200 is less than the threshold T3, and the target quantity of access carriers is two, the processing unit 202 selects the second frequency band carrier and the third frequency band carrier as carriers of the access carrier.

In the method provided in implementations of this application, the candidate carriers include two uplink carriers of the 1.8G frequency band using an FDD mode and the 3.5G frequency band using a TDD mode. Frequencies on the 1.8G frequency band are relatively low, but the coverage range is better than that of the 3.5G frequency band. The processing unit of the terminal device may select, based on the measurement result of the downlink RSRP/RSRQ or a random number, an uplink carrier that satisfies the condition for access. Because the measurement result of the RSRP/RSRQ is related to the coverage range, and the random number configured by the access network device may be related to the load, the method provided in this application may be used to select, based on the coverage range or a loading situation, uplink access carriers that are of different frequency bands and that have a relatively good coverage range or relatively light load for access. However, this application is not limited to application scenarios of the 1.8G frequency band and the 3.5G frequency band.

It should be noted that the access behavior in this application includes behaviors such as sending a preamble to perform a random access behavior, sending uplink data or a physical signal, and the like.

Optionally, the uplink data includes but is not limited to an uplink media access control (MAC) protocol data unit (PDU), an uplink MAC control element (CE), an uplink radio link control (RLC) PDU, an uplink packet data convergence protocol (PDCP) PDU, and the like. The uplink physical signal includes but is not limited to, for example, a scheduling request (SR), an acknowledgment message ACK, a non-acknowledgment message NACK, an uplink reference signal, and uplink control information (UCI). The uplink reference signal includes but is not limited to a sounding reference signal (SRS), a demodulation reference signal (DMRS), a phase tracking reference signal (PTRS), and the like.

According to the method provided in implementations of this application, the processing unit of the terminal device may further be configured to select a plurality of candidate carriers to perform carrier aggregation. At least one access control parameter includes at least one of a threshold of the downlink signal strength value corresponding to each carrier in the carrier set, a value range corresponding to each carrier, and an admission indication corresponding to each carrier. The processing unit of the terminal device selects, based on the at least one access control parameter, a required quantity of candidate carriers to perform the carrier aggregation. The processing unit of the terminal device may select the required quantity of candidate carriers by using one or a combination of a plurality of foregoing implementations to perform the carrier aggregation. Details are not described herein again.

In this embodiment of this application, when the terminal device wants to select an access carrier, and one cell has uplink access carriers of a plurality of frequency bands, the processing unit of the terminal device may select from and access uplink access carriers of different frequency bands based on at least one access control parameter (for example, the measurement result and the random number that are of the RSRP/RSRQ, and the like). As described above, because the access control parameter is related to the coverage range and the load, the method provided in this application may be used to dynamically select a to-be-accessed carrier based on the coverage range or the load, and the access manner is relatively flexible.

Figure 5:
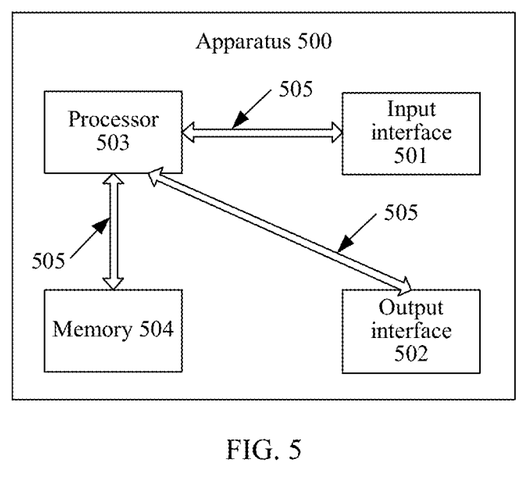
FIG. 5 is a structural diagram of a communication device according to an embodiment of this application.

FIG. 5 is another schematic diagram of a communication device 500 according to an embodiment of this application. As shown in FIG. 5, the apparatus 500 may be the access network device in the foregoing embodiments, and includes: an input interface 501, an output interface 502, a processor 503, and a memory 504. The input interface 501, the output interface 502, the processor 503, and the memory 504 may be connected to each other through a bus system 505.

The memory 504 is configured to store a program, an instruction, or code. The processor 503 is configured to perform the program, the instruction, or the code in the memory 504, to control the input interface 501 to receive a signal and control the output interface 502 to send the signal, and implement steps and functions implemented by the access network device in the implementation corresponding to the foregoing FIG. 3. Details are not described herein again. For specific implementations of the foregoing input interface 501, output interface 502, and processor 503, refer to corresponding descriptions of the sending unit 402 and the processing unit 401 that are in implementations of the foregoing FIG. 4. Details are not described herein again.

It should be understood that in this embodiment of this application, the processor 503 may be a central processing unit (CPU), or may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory 504 may include a read-only memory and a random access memory, and provide an instruction and data to the processor 503 separately. Some of the memory 504 may further include a non-volatile random access memory. For example, the memory 504 may further store information of a device type.

The bus system 505 may further include a power bus, a control bus, a status signal bus, and the like, in addition to a data bus. However, for clear description, various types of buses in the figure are marked as the bus system.

In an implementation process, steps of the method shown in FIG. 4 can be implemented by using an integrated logical circuit of hardware in the processor 503, or by using instructions in a software form. The steps of the method disclosed with reference to the embodiments of this application may be directly performed by a hardware processor, or may be performed by using a combination of hardware in the processor and a software unit. A software unit may be located in a mature storage medium in the art, such as a random memory, a flash memory, a read-only memory, a programmable read-only memory, an electrically erasable programmable memory, a register, or the like. The storage medium may be separately located in the memory 504. The processor 503 reads information in the memory 504, and completes the steps of the method in FIG. 2 in combination with hardware of the processor 503. To avoid repetition, details are not described herein again.

It should be noted that, in a specific implementation, the processing unit in FIG. 3 may be implemented by using a processor similar to the processor 503 in FIG. 5, the sending unit may be implemented by using a transmitter, and the receiving unit may be implemented by using a receiver.

Examples of the present invention also provide an apparatus (for example, an integrated circuit, a wireless device, a circuit module, or the like), configured to implement the foregoing method. The apparatus of the power tracker and/or the power supply generator described in this specification may be a self-supporting device or a part of a relatively large device. The device may be (i) a self-supporting IC; (ii) a set having one or more ICs, and the set may include a memory IC configured to store data and/or an instruction; (iii) an RFIC, such as an RF receiver or an RF transmitter/receiver; (iv) an ASIC, such as a mobile station modem; (v) a module that can be embedded in another device; (vi) a receiver, a cellular phone, a wireless device, a handset, or a mobile unit; (vii) and the like.

The method and apparatus provided in the embodiments of the present invention may be applied to the terminal device or the access network device (may be collectively referred to as the wireless device). The terminal device or the access network device or the wireless device may include a hardware layer, an operating system layer that runs on the hardware layer, and an application layer that runs on the operating system layer. The hardware layer includes hardware such as a central processing unit (CPU), a memory management unit (MMU), and a memory (also referred to as a main memory). The operating system may be any one or more computer operating systems such as a Linux operating system, a Unix operating system, an Android operating system, an iOS operating system, or a windows operating system that implement service processing by using a process. The application layer includes applications such as a browser, an address book, word processing software, and instant messaging software. In the embodiments of the present invention, a specific structure of an execution body of the method is not limited in the embodiments of the present invention, provided that communication can be performed based on the signal transmission method in the embodiments of the present invention by running a program of code recording the method in the embodiments of the present invention. For example, the execution body of the wireless communication method in the embodiments of the present invention may be a terminal device or an access network device, or a functional module that is in a terminal device or an access network device and that can invoke a program and execute the program.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

In addition, aspects or features in the embodiments of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, (SSD)), or the like.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A method for data transmission in multiple carriers, comprising:
    receiving, by a terminal device, at least one piece of indication information from an access network device, wherein the at least one piece of indication information indicates at least one access control parameter; and
    selecting, by the terminal device, an access carrier from at least two candidate carriers based on the at least one access control parameter, wherein the at least two candidate carriers are in different frequency bands, wherein the at least two candidate carriers are a part or all of a carrier set, the carrier set comprises at least two carriers, the at least one access control parameter comprises at least one of a threshold of a downlink signal strength value corresponding to each carrier in the carrier set, a value range corresponding to each carrier, and an admission indication corresponding to each carrier, and wherein the method further comprises:
  determining, by the terminal device, a carrier that satisfies a first condition and that is in the at least two carriers as the candidate carrier, wherein the first condition comprises at least one of the following:
    a downlink signal strength value of a carrier is greater than the threshold of the downlink signal strength value corresponding to the carrier;
    a random number generated for a carrier is in the value range corresponding to the carrier; and
    the admission indication corresponding to a carrier indicates permission to access the carrier.

2. The method according to claim 1, wherein the at least two candidate carriers comprise a first candidate carrier and a second candidate carrier,
  the at least one access control parameter comprises a first threshold of downlink signal strength; and
  the selecting, by the terminal device, an access carrier from the at least two candidate carriers based on the at least one access control parameter comprises:
  selecting, by the terminal device, the first candidate carrier as the access carrier when a downlink signal strength value of the first candidate carrier is greater than the first threshold; and
  selecting, by the terminal device, the second candidate carrier as the access carrier when the downlink signal strength value of the first candidate carrier is less than the first threshold.

3. The method according to claim 1, wherein the at least two candidate carriers comprise a first candidate carrier and a second candidate carrier,
  the at least one access control parameter comprises a first access control factor; and
  the selecting, by the terminal device, an access carrier from the at least two candidate carriers based on the at least one access control parameter comprises:
  selecting, by the terminal device, the first candidate carrier as the access carrier when a random number generated by the terminal device is greater than the first access control factor; and selecting, by the terminal device, the second candidate carrier as the access carrier when the random number generated by the terminal device is less than the first access control factor; or
  selecting, by the terminal device, the first candidate carrier as the access carrier when a random number generated by the terminal device is less than the first access control factor; and selecting, by the terminal device, the second candidate carrier as the access carrier when the random number generated by the terminal device is greater than the first access control factor.

4. The method according to claim 1, wherein the at least two candidate carriers are N candidate carriers, N≥2, the at least one access control parameter comprises N non-overlapping value ranges, and the N non-overlapping value ranges correspond to the N candidate carriers; and the selecting, by the terminal device, an access carrier from the at least two candidate carriers based on the at least one access control parameter comprises:
  selecting, by the terminal device, a candidate carrier corresponding to a first value range as the access carrier when a random number generated by the terminal device is in the first value range of the N non-overlapping value ranges.

5. The method according to claim 1, wherein the at least two candidate carriers comprise at least one first candidate carrier and at least one second candidate carrier;
  the at least one access control parameter comprises at least one first threshold of downlink signal strength, the at least one first threshold corresponding to the at least one first candidate carrier; and
  the selecting, by the terminal device, an access carrier from the at least two candidate carriers based on the at least one access control parameter comprises:
  selecting, by the terminal device, from the at least one first candidate carrier, a candidate carrier in which a downlink signal strength is greater than a corresponding first threshold as the access carrier; and
  selecting the at least one second candidate carrier as the access carrier when a quantity of candidate carriers selected from the at least one first candidate carrier as the access carrier is less than a target quantity.

6. A device, comprising:
  a processor; and
  a storage medium storing a program to be executed by the processor, the program including instructions that, when executed, cause the processor to:
  receive at least one piece of indication information from an access network device, wherein the at least one piece of indication information indicates at least one access control parameter; and
  select an access carrier from the at least two candidate carriers based on the at least one access control parameter, wherein the at least two candidate carriers are in different frequency bands;
  wherein the at least two candidate carriers are a part or all of a carrier set, the carrier set comprises at least two carriers, the at least one access control parameter further comprises at least one of a threshold of a downlink signal strength value corresponding to each carrier in the carrier set, a value range corresponding to each carrier, and an admission indication corresponding to each carrier, and
  wherein the program further includes the instructions to determine a carrier that satisfies a first condition and that is in the at least two carriers as the candidate carrier; and
  wherein the first condition comprises at least one of the following:
    a downlink signal strength value of a carrier is greater than the threshold of the downlink signal strength value corresponding to the carrier;
    a random number generated for a carrier is in the value range corresponding to the carrier; and
    the admission indication corresponding to a carrier indicates permission to access the carrier.

7. The device according to claim 6, wherein the at least two candidate carriers comprise a first candidate carrier and a second candidate carrier,
  the at least one access control parameter comprises a first threshold of downlink signal strength; and
  the program further includes the instructions that cause the processor to:

select the first candidate carrier as the access carrier when a downlink signal strength value of the first candidate carrier is greater than the first threshold; and select the second candidate carrier as the access carrier when the downlink signal strength value of the first candidate carrier is less than the first threshold.

8. The device according to claim 6, wherein the at least two candidate carriers comprise a first candidate carrier and a second candidate carrier, the at least one access control parameter comprises a first access control factor; and the program further includes the instructions that cause the processor to:

select the first candidate carrier as the access carrier when a random number generated by the device is greater than the first access control factor; and select the second candidate carrier as the access carrier when the random number is less than the first access control factor; or select the first candidate carrier as the access carrier when a random number is less than the first access control factor; and select the second candidate carrier as the access carrier when the random number is greater than the first access control factor.

9. The device according to claim 6, wherein the at least two candidate carriers are N candidate carriers, $N \geq 2$, the at least one access control parameter comprises N non-overlapping value ranges, and the N non-overlapping value ranges correspond to the N candidate carriers; and the program further includes the instructions that cause the processor to:

select a candidate carrier corresponding to a first value range as the access carrier when a random number is in the first value range of the N non-overlapping value ranges.

10. The device according to claim 6, wherein the at least two candidate carriers comprise at least one first candidate carrier and at least one second candidate carrier;

the at least one access control parameter comprises at least one first threshold of downlink signal strength, the at least one first threshold corresponding to the at least one first candidate carrier; and wherein the program further includes the instructions that cause the processor to:

select from the at least one first candidate carrier, a candidate carrier in which a downlink signal strength is greater than a corresponding first threshold as the access carrier; and select the at least one second candidate carrier as the access carrier when a quantity of candidate carriers selected from the at least one first candidate carrier as the access carrier is fewer than a target quantity.

11. A device, comprising:

a processor; and a storage medium storing a program to be executed by the processor, the program including instructions that cause the processor to:

generate at least one piece of indication information, wherein the at least one piece of indication information indicates at least one access control parameter, the at least one access control parameter is used to select an access carrier from at least two candidate carriers, and the at least two candidate carriers are located in different frequency bands; and send the indication information to a terminal device;

wherein the at least two candidate carriers are a part or all of a carrier set, the carrier set comprises at least two carriers, the at least one access control parameter further comprises at least one of a threshold of a downlink signal strength value corresponding to each carrier in the carrier set, a value range corresponding to each carrier, and an admission indication corresponding to each carrier, the candidate carrier is a carrier that satisfies a first condition and that is in the at least two carriers; and wherein the first condition comprises at least one of the following:

a downlink signal strength value of a carrier is greater than the threshold of the downlink signal strength value corresponding to the carrier;

a random number generated for a carrier is in the value range corresponding to the carrier; and the admission indication corresponding to a carrier indicates permission to access the carrier.

12. The device according to claim 11, wherein the at least two candidate carriers comprise a first candidate carrier and a second candidate carrier, the at least one access control parameter comprises a first threshold of downlink signal strength, the first threshold instructs the terminal device to select the first candidate carrier as the access carrier when a downlink signal strength value of the first candidate carrier is greater than the first threshold, and select the second candidate carrier as the access carrier when the downlink signal strength value of the first candidate carrier is less than the first threshold.

13. The device according to claim 11, wherein the at least two candidate carriers comprise a first candidate carrier and a second candidate carrier, the at least one access control parameter comprises a first access control factor, the first access control factor indicates that the first candidate carrier is selected as the access carrier when a random number generated by the terminal device is greater than the first access control factor, and the second candidate carrier is selected as the access carrier when the random number generated by the terminal device is less than the first access control factor.

14. The device according to claim 11, wherein the at least two candidate carriers are N candidate carriers, $N \geq 2$, the at least one access control parameter comprises N non-overlapping value ranges, and the N value ranges correspond to the N candidate carriers; and the N overlapping value ranges indicate that a candidate carrier corresponding to a first value range is selected as the access carrier when a random number generated by the terminal device is located in the first value range of the N overlapping value ranges.

15. The device according to claim 11, wherein the at least two candidate carriers comprise at least one first candidate carrier and at least one second candidate carrier; the at least one access control parameter comprises at least one first threshold of downlink signal strength, and the at least one first threshold corresponds to the at least one first candidate carrier; the first threshold instructs the terminal device to select, from the at least one first candidate carrier, a candidate carrier in which a downlink signal strength is greater than a corresponding first threshold as the access carrier; and select the at least one second candidate carrier as the access carrier when a quantity of candidate carriers selected from the at least one first candidate carrier as the access carrier is less than a target quantity.

* * * * *

UNITED STATES PATENT AND TRADEMARK OFFICE
CERTIFICATE OF CORRECTION

PATENT NO. : 11,395,264 B2
APPLICATION NO. : 16/847905
DATED : July 19, 2022
INVENTOR(S) : Feng Yu et al.

It is certified that error appears in the above-identified patent and that said Letters Patent is hereby corrected as shown below:

In the Claims

In Column 15, Line 2, in Claim 1, delete "band," and insert -- band; --.

Signed and Sealed this
Twentieth Day of September, 2022

Katherine Kelly Vidal
*Director of the United States Patent and Trademark Office*